Patented Oct. 6, 1931

1,825,874

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

NEW VAT DYESTUFFS

No Drawing.   Application filed March 15, 1929.   Serial No. 347,444.

The present invention relates to valuable new vat dyestuffs.

We have found that valuable dyestuffs dyeing the vegetable fibre from the vat currant to red-violet shades of excellent fastness and great strength are obtained by condensing 1 molecular proportion of a 3.4.8.9-dibenzopyrene-5.10-quinone containing from 1 to 2 halogen atoms with from 1 to 2 molecular proportions of alpha-aminoanthraquinone. By such condensation halogen hydride is split off and accordingly the resulting products correspond to the general formula

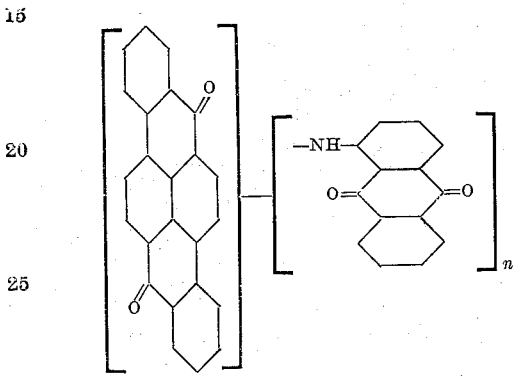

wherein $n$ is 1 or 2. The said new products are blue-violet powders dissolving in concentrated sulphuric acid to give red to blue red solutions and dye cotton from a brown red to blue red vat strong currant to violet red shades of excellent fasteness.

Those of the new condensation products according to the present invention, which are obtainable from 1 molecular proportion of a dihalogen-3.4.8.9-dibenzopyrene-5.10-quinone and 2 molecular proportions of alpha-aminoanthraquinone, and in particular those derived from the dibromo-3.4.8.9-dibenzopyrene-5.10-quinone which is obtainable by dissolving 33 parts of pure 3.4.8.9-dibenzopyrene-5.10-quinone in 330 parts of chlorosulphonic acid, adding from 1.65 to 2.3 parts of iodine and then at room temperature 20 parts of bromine, and heating to from 70° to 80° C. until the bulk of the bromine has been taken up, the constitution of this product is probably as follows:

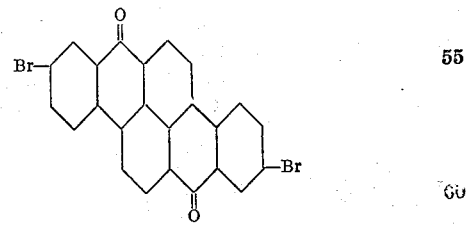

are the most valuable products due to valuable shade and their high tinctorial strength.

When the new condensation products are treated with acid condensing agents, for example with aluminum chloride or with a mixture of aluminum chloride and sodium chloride, formation of a carbazol nucleus takes place and new dyestuffs are obtained which are only difficultly soluble in concentrated sulphuric acid with the formation of a blue solution and which dye the vegetable fibre from a violet vat very fast brown shades.

When the new condensation products corresponding to the above formula are treated with oxidizing agents in acid solution, for example with manganese dioxide in sulphuric acid, new dyestuffs are obtained which dye cotton from a violet vat strong grey shades and dissolve in concentrated sulphuric acid to a violet solution. When these dyestuffs are alkylated, for example, methylated, they are converted into products dyeing the vegetable fibre from red-violet vats dark blue shades.

The following examples will further illustrate the nature of the present invention which however is not limited thereto. The parts are by weight.

Example 1

98 parts of the dibromo-3.4.8.9-dibenzopyrene-5.10-quinone specifically referred to above in a finely divided state are boiled in 1500 parts of naphthalene, while stirring, with 100 parts of calcined sodium carbonate, 10 parts of copper oxide and 92 parts of alpha-aminoanthraquinone, until the reaction product is practically free from bromine. The mass is allowed to cool to about 130° to 140° C. and diluted with 1500 parts of monochlorobenzene. The reaction product is filtered by suction and treated with steam in order to remove the last traces of solvent. It may also be isolated by distilling off the solvent, if desired with the aid of a vacuum or of steam or both. The yield of the new product is almost quantitative. The resulting dye-stuff is a blue violet powder crystallizing from nitrobenzene in the form of fine needles. It dissolves in concentrated sulphuric acid with a blue red coloration and dyes cotton from a brown vat currant shades of excellent fastness.

Instead of the aforesaid dibromo-3.4.8.9-dibenzopyrene-5.10-quinone, an equivalent amount of the corresponding dichloro- or diiodo-derivative may be used. The reaction may also be carried out in other solvents or suspension media than naphthalene, for example in nitrobenzene, or also in the absence of solvents or suspension media.

*Example 2*

41 parts of monobromo-3.4.8.9-dibenzopyrene-5.10-quinone are boiled, while stirring, in 400 parts of naphthalene with 25 parts of alpha-aminoanthraquinone, 30 parts of calcined sodium carbonate and 4 parts of copper oxide, until the reaction product is practically free from bromine. The resulting dyestuff is worked up as described in example 1 and is a violet powder dissolving to a red solution in concentrated sulphuric acid and dyeing cotton from a blue red vat red-violet shades of excellent fastness.

What we claim is:

1. As new articles of manufacture, the vat dyestuffs corresponding to the general formula

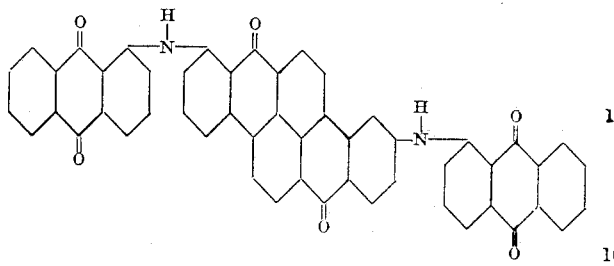

wherein $n$ is 1 or 2, which dyestuffs dye cotton strong currant to violet red shades of excellent fastness from brown red to blue red vats and dissolve to red to blue red solutions in concentrated sulphuric acid.

2. As new articles of manufacture, the vat dyestuffs corresponding to the general formula

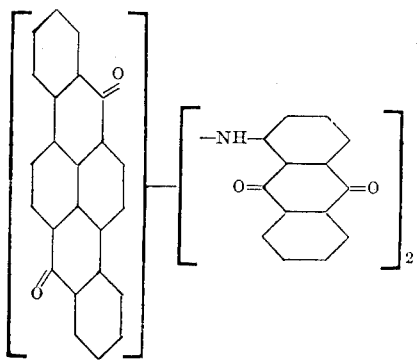

which dye cotton from brown red vats strong currant shades of excellent fastness and dissolve in concentrated sulphuric acid to give blue red solutions.

3. As a new article of manufacture, the vat dyestuff probably corresponding to the formula

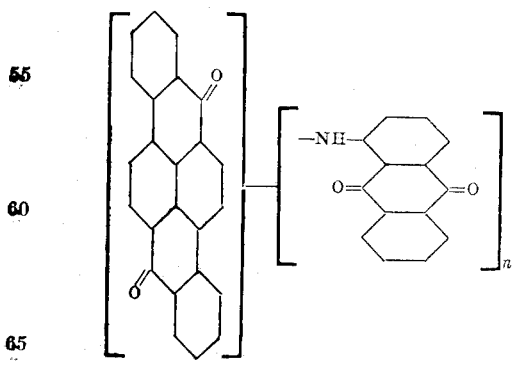

which dyes cotton from a brown red vat strong currant shades of excellent fastness, dissolves to a blue red solution in concentrated sulphuric acid, and which is obtainable by condensing 2 molecular proportions of alpha-amino-anthraquinone with 1 molecular proportion of the dibromo-3.4.8.9-dibenzopyrene-5.10-quinone which is obtainable by dissolving 33 parts of pure 3.4.8.9-dibenzopyrene-5.10-quinone in 330 parts of chlorosulphonic acid, adding from 1.65 to 2.3 parts of iodine and then at room temperature 20 parts of bromine, and heating to from 70° to 80° C. until the bulk of the bromine has been taken up.

In testimony whereof we have hereunto set our hands.

MAX ALBERT KUNZ.
KARL KOEBERLE.

Certificate of Correction

Patent No. 1,825,874.  Granted October 6, 1931, to

MAX ALBERT KUNZ ET AL.

It is hereby certified that error appears in the printed specification of the above-numbered patent requiring correction as follows: Page 2, claim 3, strike out the formula and insert instead

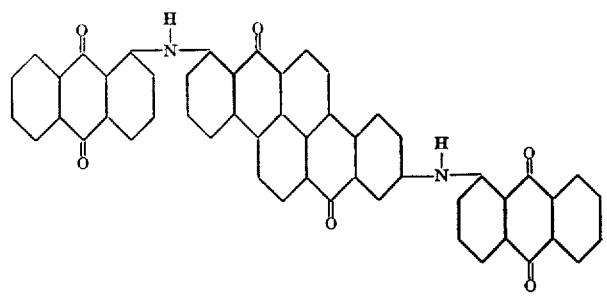

and that the said Letters Patent should be read with this correction therein that the same may conform to the record of the case in the Patent Office.

Signed and sealed this 26th day of January, A. D. 1932.

[SEAL.]  M. J. MOORE,
*Acting Commissioner of Patents.*